US007029362B1

(12) United States Patent
Halstead

(10) Patent No.: US 7,029,362 B1
(45) Date of Patent: Apr. 18, 2006

(54) GAME ATTRACTANT

(75) Inventor: Scott M. Halstead, Knoxville, TN (US)

(73) Assignee: Halstead Services Group, LLC, Knoxville, TN (US)

(*) Notice: Subject to any disclaimer, the term of this patent is extended or adjusted under 35 U.S.C. 154(b) by 140 days.

(21) Appl. No.: 10/419,445

(22) Filed: Apr. 21, 2003

(51) Int. Cl.
*A63H 5/00* (2006.01)

(52) U.S. Cl. ........................................ 446/418; 446/397

(58) Field of Classification Search ................ 446/397, 446/418; 43/1, 2; 248/163.1, 163.2, 165
See application file for complete search history.

(56) References Cited

U.S. PATENT DOCUMENTS 4,531,924 A * 7/1985 Samson ...................... 446/213
4,702,719 A * 10/1987 Lapid ......................... 446/227
4,934,088 A 6/1990 Pine, Jr. et al.
4,968,283 A 11/1990 Montgomery
5,555,664 A * 9/1996 Shockley ......................... 43/1
6,149,492 A * 11/2000 Davis, Jr. ................... 446/397
6,203,395 B1 * 3/2001 McElhaney ................. 446/227
6,210,251 B1 * 4/2001 Primos et al. ............. 446/397
6,289,626 B1 * 9/2001 Williams ......................... 43/2
6,357,159 B1 * 3/2002 Bowling .......................... 43/2
2001/0004812 A1 * 6/2001 Lindaman ........................ 43/2

* cited by examiner

*Primary Examiner*—John A. Ricci
(74) *Attorney, Agent, or Firm*—Luedeka, Neely & Graham PC

(57) ABSTRACT

A device for generating sounds associated with movements of animals, the device comprising a movable member operatively associated with a motion generation system and configured to be set in a desired motion by the motion generation system, and an extension assembly operatively associated with the movable member so as to cause contact with a desired contact medium to generate sounds that mimic sounds associated with movements of animals.

12 Claims, 4 Drawing Sheets

GAME ATTRACTANT

FIELD OF THE INVENTION

This invention relates generally to hunting aids. More particularly, this invention relates to a device for generating natural background noises for enhancing the effectiveness of game calls in attracting game.

BACKGROUND AND SUMMARY OF THE INVENTION

Calls simulating an animal noise are often used for attracting game to a hunter. For example, hunters of turkeys often use a call that mimics the vocal sounds of a female turkey in an attempt to attract a male turkey.

It has been observed that the effectiveness of such vocal calls may be increased if sounds associated with movement of a female turkey are provided in conjunction with the vocal sounds, such as by moving a fallen tree branch against the ground to mimic the sound of a female turkey rusting through leaves as during feeding.

As will be appreciated, it is often inconvenient and difficult for a hunter to remain concealed and still while manipulating a tree branch.

With regard to the foregoing, the present invention is directed to a device for generating sounds associated with movements of animals.

In a preferred embodiment, the device includes a movable member operatively associated with a motion generation system and configured to be set in a desired motion by the motion generation system, and an extension assembly operatively associated with the movable member so as to cause contact with a desired contact medium, such as leafs, sticks, and other natural debris on the ground to generate sounds that mimic sounds associated with movements of animals.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
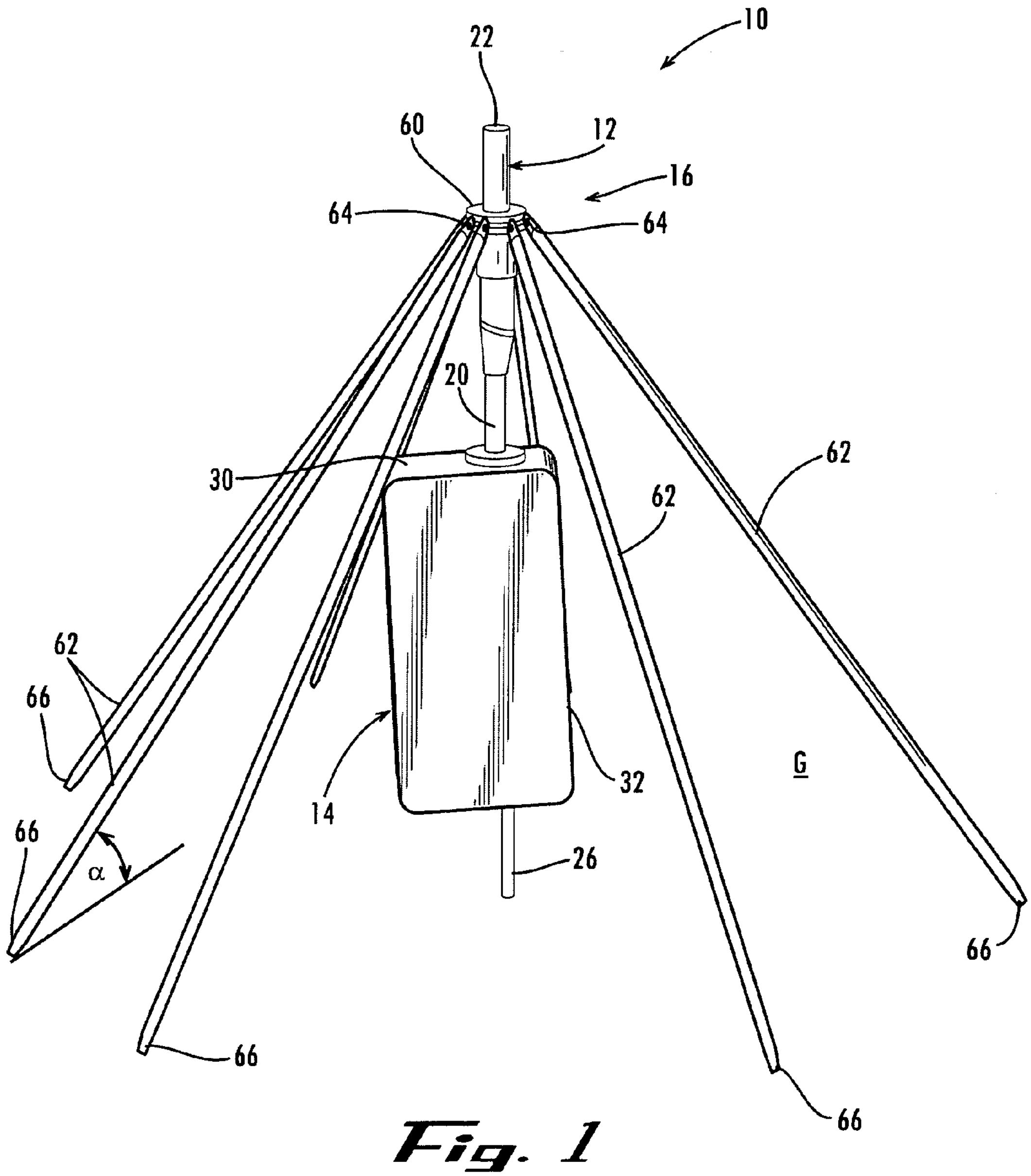
FIG. 1 is a perspective view of a device for remotely generating sounds associated with movements of animals in accordance with a preferred embodiment of the invention.

With initial reference to FIG. 1, the invention relates to a game attractant device 10 for generating sounds associated with movements of animals. The device 10 is particularly suitable for remotely generating sounds to mimic the sound of a turkey rusting through grass, leaves or other ground debris as during feeding.

The device 10 preferably includes a movable member 12, a motion generation system 14, and an extension assembly 16. The movable member 12 is configured to be set in a desired motion by the motion generation system 14. For example, in a preferred embodiment, a rotational motion is imparted to the movable member 12 by the motion generation system 14. It will be understood that the movable member 12 may be capable of other motions, such as translational and reciprocal motion.

The extension assembly 16 cooperates with the movable member 12 so as to cause contact with a desired contact medium to generate a sound. For example, in a preferred embodiment described below, portions of the extension assembly 16 contact grass, leaves or other debris on the ground to generate a rusting sound that mimics the sound of a turkey rusting through grass, leaves or other ground debris as during feeding.

Figure 2:
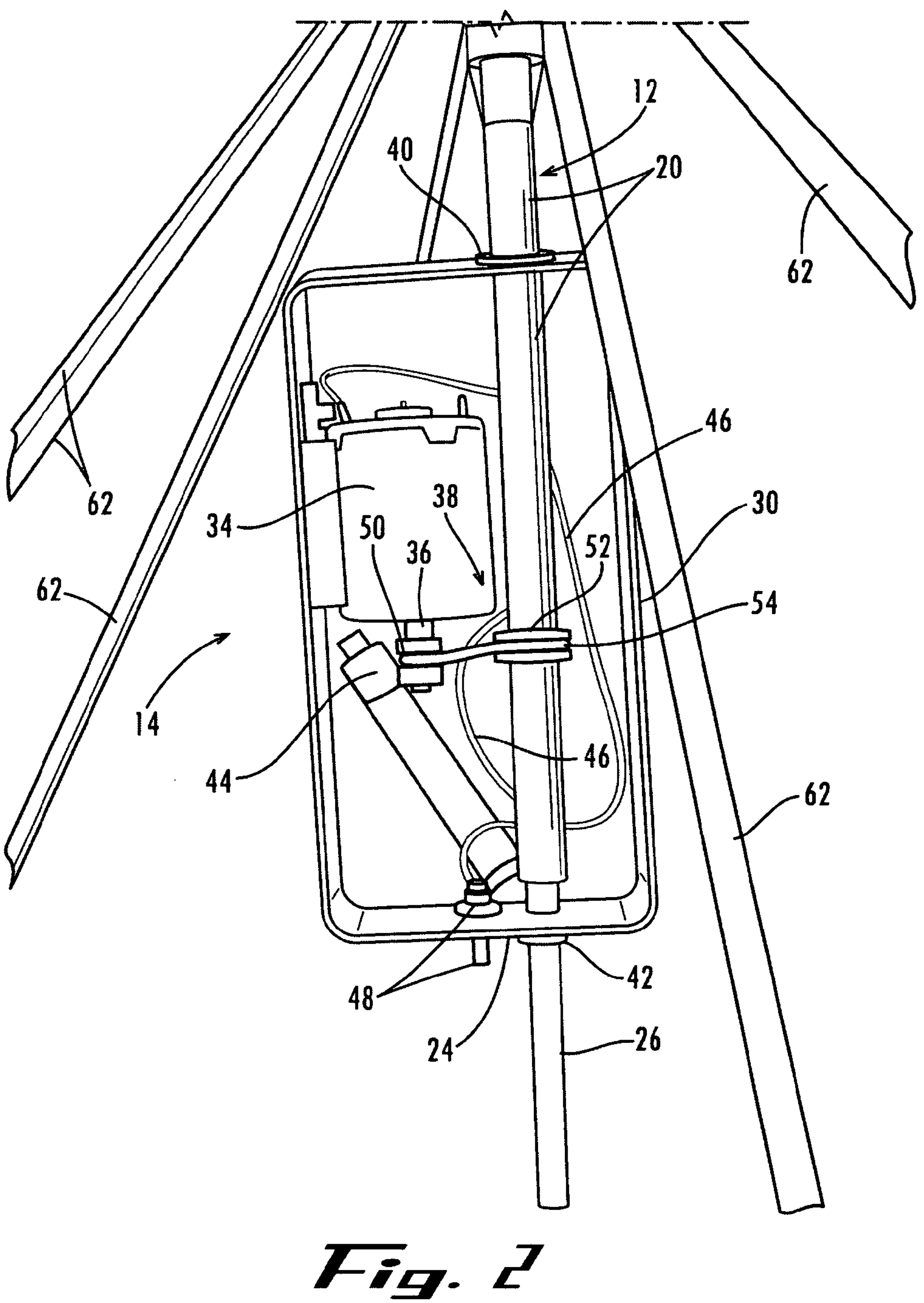
FIG. 2 is a detailed view of a drive assembly portion of the device of FIG. 1.

With further reference to FIG. 1 and with additional reference to FIG. 2, the movable member 12 may preferably be a rotatable shaft 20 and the motion generation system 14 may preferably be configured to cooperate with the shaft 20 to impart rotational motion to the shaft 20.

The shaft 20 is preferably an elongate shaft having opposite ends 22 and 24, with a relatively small external diameter of from about ⅛ to about 1 inch. The shaft 20 may preferably be hollow and include a rod 26 telescopically withdrawable from the end 24. The rod 26 may be inserted into the ground or the like for securably positioning the device 10 for use.

The motion generation system 14 preferably includes a housing 30, preferably of plastic having a removable cover 32, enclosing a motor 34, preferably a small direct current motor having a rotatable output shaft 36, and a transmission system 38 for transmitting rotational motion of the output shaft 36 to the shaft 20. In this regard, the housing 30 preferably includes oppositely disposed apertures 40 and 42 for passage of the shaft 20 and/or rod 26 through the housing 30.

The motor 64 may be of single speed or may include electronic controllers or the like for adjusting and/or varying its rotational speed as may be desired. For use in generating sounds mimicking a turkey or turkeys feeding, the motor 34 preferably has a rotational speed of from about 5 to about 50 rpms.

The motor 34 is preferably powered as by a battery 44, such as a AA size battery, located within the housing 30 and connectable to wiring 46 associated with the motor 34. The wiring 46 is preferably connected to an on/off switch 48 associated with the motor 34 and partially extending through the housing 30 for access by a user. As will be appreciated, a remotely activatable switch, such as an infrared switch may be utilized instead of the mechanical switch 48. As noted above, a timing or other control device may also be incorporated to periodically control the operation of the motor 34. For example, the motor may be periodically controlled to start or stop motion and/or change the speed thereof.

The transmission system 38 is preferably provided by a drive pulley 50 associated with the output shaft 36 of the motor 34, a driven pulley 52 associated with the shaft 20, and a belt 54 extending around the drive pulley and the driven pulley. Accordingly, rotation of the shaft 36 during operation of the motor 34 results in rotation of the drive pulley 50, which motion is imparted by the belt 54 to the driven pulley 52 and hence to the shaft 20. The pulleys 50 and 52 may be similarly sized or differently sized, or adjustably sized if desired to provide a desired rotational speed o speeds of the shaft 20.

The extension assembly 16 preferably includes a hub 60 mounted to the shaft 20 adjacent the end 22 and having a plurality of extension members 62 connected thereto. The hub 60 is preferably fixedly mounted to the shaft 20, but is preferably adjustable so that its location along the shaft 20 may be adjusted. For example, the location of the hub 60 may be fixed as by a set screw, wherein the set screw may be released to reposition the hub 60.

The extension members 62 are preferably elongate rods or the like pivotably mounted to the hub 60 as by hinges 64. The hinges 64 may simply be provided as by pins extending through corresponding and aligned apertures of the hub 60 and one end of the extension members 62. The action of the hinges 64 is useful to facilitate use of the device 10 on uneven contact surfaces.

The extension members 62 are preferably of sufficient length so as to be able to contact the ground G or other contact surface during use of the device 10. More preferably, the extension members are sufficiently long such that they are oriented at an angle $\alpha$ relative to the ground of from about 10 to about 60 degrees.

The device 10 is preferably installed as by inserted the rod 26 into the ground G so that the housing 30 is adjacent the ground 30 and the end 22 of the shaft 20 extends away from the ground G, with the shaft 20 substantially normal to the ground G and free ends 66 of the extension members 62 in contact with or closely adjacent the ground G. Leaves, twigs, grass, or other debris is preferably lightly piled around the extension members 62 and the switch 48 activated to enable power to be supplied to the motor 34 and result in rotation of the extension members 62.

During rotation, one or more of the extension members 62 at least periodically contact the leaves or other debris so as to generate a corresponding sound. It has been observed that the resulting sounds mimic the sounds of a turkey or turkeys rustling through leaves or the like as when feeding. It has been further observed that such rustling sounds are advantageous when hunting turkeys, especially when used in conjunction with a call that mimics the vocal sounds of a turkey.

Figure 3:
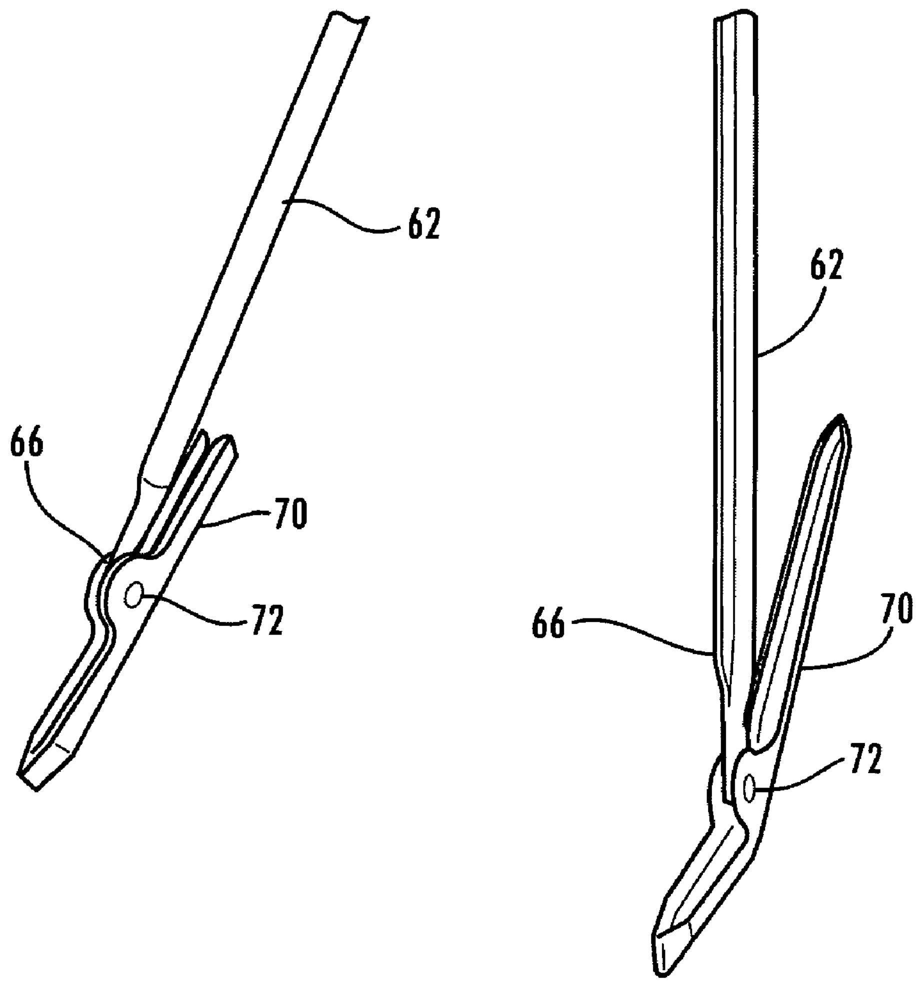
FIG. 3 is a detailed view of alternate embodiments of ground contact members for use with the device of FIG. 1.

Turning now to FIG. 3, there is seen a preferred modification of the device 10 wherein the free ends 66 of the extension members 62 are configured to include feet 70 for increasing the surface area available for contacting leaves and the like. The feet 70 are preferably pivotally mounted to the ends 66 to enable the feet 70 to better accommodate uneven surfaces such as the ground, leaves, and the like. For example, pins 72 may be inserted through aligned apertures of the ends 66 and the feet 70.

Figure 4:
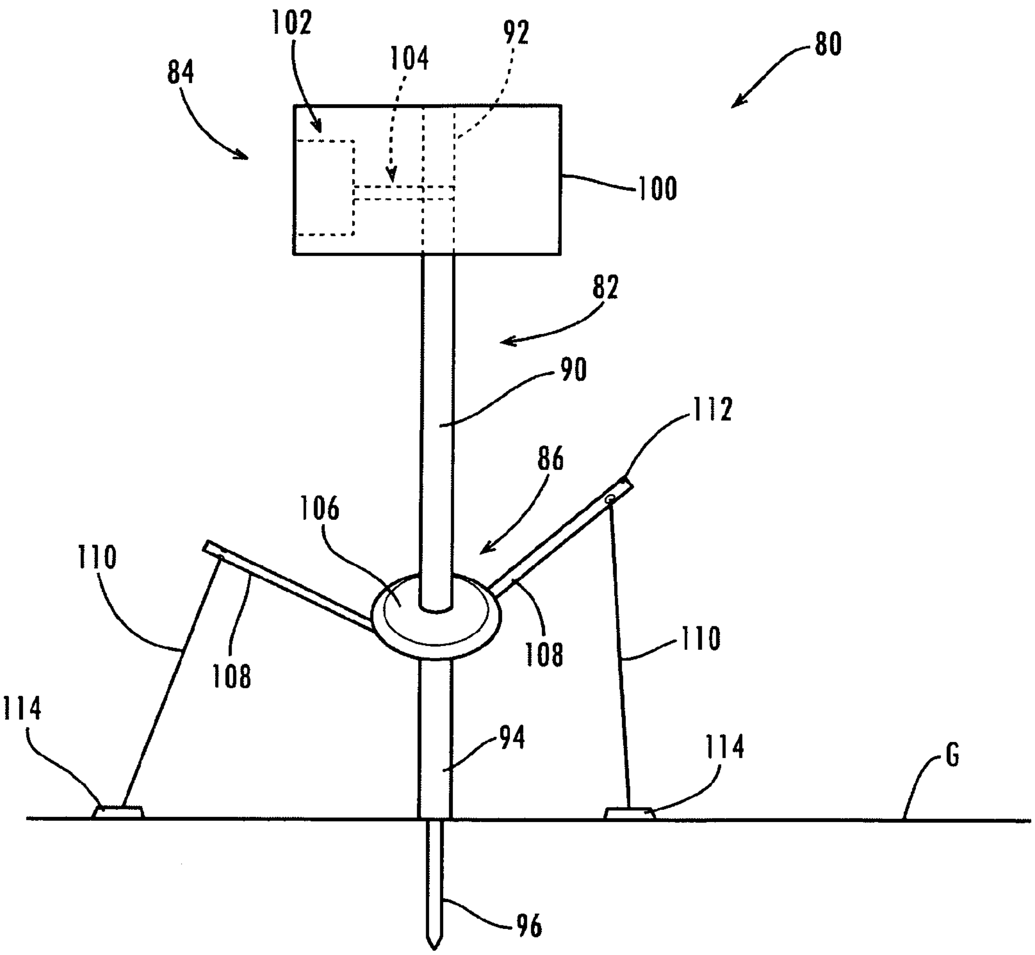
FIG. 4 is a perspective view of a device for remotely generating sounds associated with movements of animals in accordance with an alternate embodiment of the invention.

With reference now to FIG. 4, there is seen an alternate embodiment of a device 80 for generating sounds associated with movements of animals, and particularly the sound of a turkey rusting through grass, leaves or other ground debris as during feeding. The device 80 preferably includes a movable member 82, a motion generation system 84, and an extension assembly 86.

The movable member 82 is preferably a rotatable shaft 90 having opposite ends 92 and 94, and preferably including a rod 96 telescopically withdrawable from the end 94.

The motion generation system 84 preferably includes a housing 100 enclosing a motor 102 and a transmission system 104 for transmitting rotational motion of the motor 102 to the shaft 90. The housing 100, motor 102, and transmission system 104 are preferably substantially identical to the housing 30, motor 34, and transmission system 38 previously described.

The extension assembly 86 preferably includes a hub 106 mounted to the shaft 90 and having a plurality of extension members 108 connected thereto. The hub 106 is preferably substantially identical to the hub 60 previously described. The extension members 108 are preferably elongate rods or the like pivotally mounted to the hub 106 as by pins or other hinge devices, with the angle of each extension member 108 being adjustable relative to the hub 106. For example, a threaded fastener may be passed through aligned apertures of the extension member and the hub for pivotal mounting of the extension member to the hub, with the fastener being tightened to lock the extension member at a desired angle.

A wire 110 or a chord or the like preferably extends from a location adjacent free end 112 of each extension member 108. The wire 110 preferably has a sufficient length to contact the ground G regardless of the angular position of the extension member 108. Feet 114, preferably substantially similar in construction to the feet 70 described previously are preferably connected to the wires 110 for contacting the ground.

While the intention has been described in the context of a device for generating sounds for attracting turkeys, it will be understood that the invention may also be configured to attract other game such as deer, coyotes, as well as other game. For example, structures corresponding to deer antlers may be attached to the extension members so and the contact surface selected, e.g., a hard surface such as rocks selected, so as to generate sounds corresponding to deer antlers striking. Thus, the elements of the invention, namely a movable member operatively associated with a motion generation system and configured to be set in a desired motion by the motion generation system, and an extension assembly operatively associated with the movable member so as to cause contact with a desired contact medium to generate sounds that mimic sounds associated with movements of animals, may be configured in a variety of ways to generate desired sounds.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

The invention claimed is:

1. A device for generating sounds associated with movements of animals, the device comprising a movable member operatively associated with a motion generation system and configured to be set in a desired motion by the motion generation system, and an extension assembly including a hub connected to the movable member and a plurality of extension members connected to the hub, each extension member being independently pivotally movable so as to be movably positionable for contact with a desired contact medium to generate sounds that mimic sounds associated with movements of animals.

2. The device of claim 1, wherein the movable member comprises a rotatable shaft.

3. The device of claim 1, wherein the motion generation system comprises a motor having a rotatable output shaft and a transmission system for transmitting rotational motion of the output shaft of the motor to the movable member.

4. The device of claim 3, wherein the movable member comprises a rotatable shaft and the transmission system comprises a drive pulley associated with the output shaft of the motor, a driven pulley associated with the rotatable shaft of the movable member, and a belt extending around the drive pulley and the driven pulley.

5. A device for generating sounds associated with movements of animals, the device comprising a first rotatable shaft operatively associated with a motion generation system and configured to be set in a desired motion by the motion generation system including a motor having a rotatable output shaft and a transmission system for transmitting rotational motion of the output shaft of the motor to the first rotatable shaft, the transmission system including a drive pulley associated with the output shaft of the motor, a driven pulley associated with the first rotatable shaft, and a belt extending around the drive pulley and the driven pulley; and an extension assembly including a hub connected to the first rotatable shaft and a plurality of extension members connected to the hub and extending away from the hub for contacting a desired contact medium to generate sounds that mimic sounds associated with movements of animals.

6. A device for generating sounds associated with movements of animals, the device comprising a movable member operatively associated with a motion generation system and configured to be set in a desired motion by the motion generation system, and an extension assembly operatively associated with the movable member so as to cause contact with a desired contact medium to generate sounds that mimic sounds associated with movements of animals, the extension assembly comprising a hub connected to the movable member and a plurality of extension members connected to the hub.

7. The device of claim 6, wherein the motion generation system imparts a rotational motion to the movable member.

8. The device of claim 6, wherein the motion generation system imparts a translational motion to the movable member.

9. The device of claim 6, wherein the motion generation system imparts a reciprocal motion to the movable member.

10. A device for generating sounds associated with movements of animals, the device comprising a powered rotatable shaft; and a plurality of ground contact members operatively associated with the rotatable shaft for movement of the ground contact members in a rotary motion relative to the ground surface, the ground contact members each being positionable for contacting the ground surface during rotary motion thereof to generate sounds that mimic sounds associated with movements of animals along the ground.

11. The device of claim 10, wherein the motion generation system comprises an electric motor.

12. The device of claim 10, wherein the motion generation system comprises an electric motor and an electronic controller for controlling the speed of the motor.

* * * * *